(12) United States Patent
Bodart et al.

(10) Patent No.: US 7,851,400 B2
(45) Date of Patent: Dec. 14, 2010

(54) MULTIMODAL POLYETHYLENE OBTAINED WITH MULTILAYER CHROMIUM CATALYST

(75) Inventors: Philippe Bodart, Clermont-Sous-Huy (BE); Nicodeme Lonfils, Brussels (BE); Guy Debras, Frasnes-Lez-Gosselies (BE)

(73) Assignee: Total Petrochemicals Research Feluy, Seneffe (Feluy) (BE)

( * ) Notice: Subject to any disclaimer, the term of this patent is extended or adjusted under 35 U.S.C. 154(b) by 630 days.

(21) Appl. No.: 11/837,778

(22) Filed: Aug. 13, 2007

(65) Prior Publication Data

US 2008/0009407 A1 Jan. 10, 2008

Related U.S. Application Data

(62) Division of application No. 10/297,710, filed as application No. PCT/EP01/06444 on Jun. 7, 2001, now Pat. No. 7,271,122.

(30) Foreign Application Priority Data

Jun. 8, 2000 (EP) .................................. 00202039

(51) Int. Cl.
*B01J 21/06* (2006.01)
*B01J 23/26* (2006.01)

(52) U.S. Cl. ........................ 502/248; 502/103; 502/107; 502/132; 526/104; 526/352

(58) Field of Classification Search ................. 502/103, 502/107, 132, 204, 248; 526/104, 352
See application file for complete search history.

(56) References Cited

U.S. PATENT DOCUMENTS 5,885,924 A * 3/1999 Ward ........................... 502/402

FOREIGN PATENT DOCUMENTS

| EP | 0 905 148 | * | 3/1999 |
| EP | 0 962 469 | * | 12/1999 |

* cited by examiner

Primary Examiner—Ling-Siu Choi
(74) Attorney, Agent, or Firm—Tenley R. Krueger

(57) ABSTRACT

The present invention concerns a catalyst for the production of high density polyethylene, by homopolymerising ethylene or copolymerising ethylene and an alpha-olefinic comonomer comprising 3 to 10 carbon atoms, prepared by the steps of:
a) selecting a silica support with a specific surface area larger than 300 $m^2/g$;
b) treating the silica support with a titanium compound, in order to introduce titanium into the support, or with an aluminium compound, in order to introduce aluminum into the support;
c) either treating the titanated silica support with an aluminum compound, in order to introduce aluminum into the titanated silica support, or treating the aluminated silica support with a titanium compound, in order to introduce titanium into the aluminated silica support;
d) depositing a chromium compound on the titanated and aluminated silica support to form a catalyst;
e) activating the catalyst of step d) under air in a fluidised bed at a temperature of from 600 to 800° C.

12 Claims, 9 Drawing Sheets

MULTIMODAL POLYETHYLENE OBTAINED WITH MULTILAYER CHROMIUM CATALYST

This is a divisional of U.S. patent application Ser. No. 10/297,710 flied Jun. 16, 2003, now U.S. Pat. No. 7,271,122, based on PCT/EP01/06444 filed Jun. 7, 2001 based on EP 00202039.4 filed Jun. 8, 2000.

This invention relates to a catalyst for producing polyethylene with a very broad molecular weight distribution. The present invention further relates to a process for producing said catalyst and to the use of such a catalyst.

For polyethylene, and for high density polyethylene in particular, the molecular weight distribution (MWD) is a fundamental property which determines the properties of the polymer, and thus its applications. It is generally desirable for the polyethylene resin to have good processing properties whereby the polyethylene may readily be processed to form the appropriate article. In order to achieve such good processability of the polyethylene resins, it is desired that the flow properties of the polyethylene resins are improved; it is in particular desirable that the polyethylene resin has a high melt index, which is an indication of low molecular weight polyethylene polymers in the polyethylene resin. Good physical properties can be obtained with polyethylene having a high molecular weight. These high molecular weight molecules, however, render the polymer more difficult to process. The broadening of the molecular weight distribution permits an improvement in the processing of polyethylene at high molecular weight while keeping its good physical properties.

The molecular weight distribution can be completely defined by means of a curve obtained by gel permeation chromatography (GPC). Generally, the molecular weight distribution (MWD) is more simply defined by a parameter, known as the dispersion index D, which is the ratio between the average molecular weight by weight (Mw) and the average molecular weight by number (Mn). The dispersion index constitutes a measure of the width of the molecular weight distribution. For most applications, the dispersion index varies between 7 and 30.

A variety of catalyst systems are known for the manufacture of polyethylene. It is known in the art that the physical properties, in particular the mechanical properties, of a polyethylene resin can vary depending upon what catalyst system was employed to make the polyethylene. This is because different catalyst systems tend to yield different molecular weight distributions in the polyethylene produced. It is known to employ a chromium-based catalyst i.e. a catalyst known in the art as a "Phillips catalyst". Such a chromium-based catalyst enables the production of polyethylene having desirable physical and rheological properties. There is a continuous incentive to develop new chromium-based Phillips catalysts for the production of polyethylene resins having improved mechanical or processing properties.

Such supported chromium-oxide Phillips catalysts which have been developed for the production of high density polyethylene resins incorporate a support which is usually a silica, with a large surface area, typically greater than 200 m$^2$/g, and a large pore volume, typically greater than 0.8 ml/g. The support may be modified so as to include cogels such as silica-titania or silica-alumina and by the replacement of silica by alumina or amorphous aluminium phosphates. Furthermore, the support may comprise a tergel which is produced by mixing a chromium source with the silica and titania compound.

EP-A-0712868 discloses a catalytic system for the polymerisation of olefins comprising a catalytic solid based on chrome deposited on a support comprising silica, alumina and aluminium phosphate, together with an organoaluminium cocatalyst. Titanium dioxide may be present in the support. The support may be prepared by a co-precipitation technique.

U.S. Pat. No. 4,727,124 and EP 0250860 disclose the preparation of a supported catalyst which is laden with chromium, phosphorous and titanium and has a silicate carrier. The silicate carrier is mixed successively with suspensions incorporating chromium trioxide, a phosphate or phosphite and a titanate prior to the suspension being evaporated to dryness.

Amorphous aluminium phosphates with both high surface area and high pore volume have been found in the art to be difficult to produce. Consequently, it has been known to use a process known as "poregelisation" for introducing a metal phosphate, in particular an aluminium phosphate, into the silica support. EP-A-0,055,864 discloses such a process for introducing metal phosphates into the silica support of a chromium-based catalyst for olefin polymerisation. In contrast to standard chromium-based catalysts having a silica support which has been impregnated with chromium oxide, the metal phosphate supported chromium-based catalysts are characterised by an outstanding sensitivity to hydrogen. The introduction of hydrogen into the polymerisation medium induces a drastic increase in the melt flow index of the resultant polyethylene resins. In addition, the introduction of triethyl boron (TEB) cocatalyst can result in an increase of the melt flow index of the polyethylene resins, whereas with standard chromium-based catalysts incorporating a silica support, the TEB induces a decrease in the melt flow index. In addition, the metal phosphate supported chromium-based catalysts can produce resins with a broad molecular weight distribution and good mechanical properties, particularly improved environmental stress cracking resistance (ESCR).

The metal phosphate supported chromium-based catalysts disclosed in EP-A-0,055,864 suffer from the disadvantage that the melt index potential of the catalyst is quite low without the use of hydrogen and/or TEB in a polymerisation medium. Moreover, those catalysts suffer from the technical problem that they have relatively low activity for the polymerisation process for the manufacture of polyethylene.

WO-A-94/26798 also discloses a cogelation process in which a catalyst support containing at least two components chosen among silica, alumina and aluminium phosphate is formed as a gel which is then washed and dried to form a powder which is then calcined. Titanium may be present in the support.

These known catalysts are often used with a triethylboron (TEB) cocatalyst. They are quite sensitive to the introduction of hydrogen in the polymerisation medium. Introduction of TEB or hydrogen or the use of high activation temperature are often required in order to achieve the desired high level of activity and high melt flow potential. The elevated activation temperature, however will be detrimental to the mechanical properties of the resins in general and of the environmental stress cracking resistance (ESCR) in particular.

It is known in the art to provide titanium in a chromium-based catalyst. Titanium can be incorporated either into the support for the chromium catalyst or into the catalytic composition deposited on the support.

Titanium can be incorporated into the support by coprecipitation or terprecipitation as is the case for cogel or tergel type catalysts developed by Phillips Petroleum. Cogel and tergel catalysts respectively are binary and ternary supports. Alternatively, titanium can be incorporated into the support by impregnation of the support as described for example in U.S. Pat. No. 4,402,864 or by chemisorption of a titanium compound into the support as described for example in U.S. Pat. No. 4,016,343.

Titanation of the catalytic composition has been disclosed in earlier patent specifications. U.S. Pat. No. 4,728,703 discloses that titanium can be incorporated into the catalytic composition by adding to a composite liquid suspension, of a carrier material (i.e. a support) and chromium trioxide, a titanium compound of the formula $Ti(OR)_4$. U.S. Pat. No. 4,184,979 or EP-A-0,882,743 disclose that titanium can be incorporated into the catalytic composition by adding at elevated temperature a titanium compound such as titanium tetraisopropoxide to a chromium-based catalyst which has been heated in a dry inert gas. The titanated catalyst is then activated at elevated temperature.

It is also known from EP-A-0,857,736 or EP-A-0,905,148 to prepare a chromium-impregnated catalyst having a silica-alumina support.

The ethylene polymers obtained with the above mentioned processes do not exhibit the desired good processing and mechanical properties together with a high catalyst activity.

Therefore, there exists a need for a chromium-based catalyst capable of producing polyethylene resins for blow molding, having a very broad molecular weight distribution and thus good processability and good physical properties.

It is an object of the present invention to produce polyethylene with a very broad molecular weight distribution: it can be trimodal.

It is another object of the present invention to provide a catalyst for the polymerisation of ethylene to produce polyethylene having a very broad molecular weight distribution, in a single reactor.

This aim has been achieved by developing a multiple-site chromium catalyst with grains having an outer shell enriched in titanium and aluminium.

The present invention provides a process for preparing a supported chromium/silica-titanium-aluminium catalyst for the production of high density polyethylene, by polymerising ethylene or copolymerising ethylene and an alpha-olefinic comonomer comprising 3 to 10 carbon atoms, which comprises the steps of;

a) selecting a silica support with a specific surface area typically larger than $300 \, m^2/g$ and a pore volume larger than $1.5 \, cm^3/g$;
b) treating the silica support grains with a titanium compound or an aluminium compound, in order to coat said silica grains with a first thin external shell of titanium or aluminium;
c) either treating the titanated silica support grains with an aluminium compound or treating the aluminated silica support grains with a titanium compound, in order to coat said titanated or aluminated grains with a second thin external shell of the other compound;
d) depositing a chromium compound on the titanated and aluminated silica support grains to form a catalyst;
e) activating the catalyst of step e) under air in a fluidised bed at a temperature of from 600 to 800° C.

Preferably, the titanation step precedes the alumination step.

Preferably, between step b) and step c), the titanated or aluminated silica support is oxidised in the presence of air.

Preferably, between step c) and step d), the titanated and aluminated silica support is oxidised in the presence of air;

Optionally, the catalyst of step e) can be fluorinated during the activation step.

The present invention further provides a supported multiple-site chromium catalyst for the production of very broad or trimodal molecular weight distribution high density polyethylene, by polymerising ethylene, or copolymerising ethylene and an alpha-olefinic comonomer comprising 3 to 10 carbon atoms. Said catalyst comprises a silica support with a specific surface area typically larger than $300 \, m^2/g$, a titanium compound deposited on the support and an aluminium compound deposited on the support, before or after the titanium compound, a chromium compound deposited on the titanated and aluminated support, characterised in that the titanium compound and the aluminium compound are each located in a thin separate external shell at the surface of the catalyst grain.

The present invention also provides the use of the catalyst of the invention in the production of high density polyethylene having a trimodal or a very broad molecular weight distribution.

The silica-containing support material used in the catalyst of this invention can be any catalytic support known in the art. The specific surface area is typically larger than $300 \, m^2/g$ and the pore volume greater than $1.5 \, ml/g$. Preferably, the surface area is larger than $350 \, m^2/g$ and more preferably larger than $450 \, m^2/g$ and the pore volume is greater than $2 \, ml/g$.

The aluminium compound used in the present invention comprises a polymeric aluminium oxyalkyl compound such as methyl aluminium oxane (MAO).

The titanium compound may be of the formula $R_n Ti(OR')_m$ or $(RO)_n Ti(OR')_m$ wherein R and R' are the same or different and can be any hydrocarbyl group containing from 1 to 12 carbon atoms, n is 0 to 3, m is 1 to 4 and m+n equals 4. Preferably, the titanium compound is a titanium tetraalkoxide $Ti(OR')_4$ where R' can be an alkyl or a cycloalkyl group each having from 3 to 5 carbon atoms. Preferably, the titanium compound is titanium isopropoxide. The titanation is performed by progressively introducing the titanium compound into the stream of a dry inert non-oxidising gas in a fluid bed activator. The temperature is maintained at least at 300° C. Preferably, the titanium compound is pumped as a liquid into the reaction zone where it vaporises. The titanation step is controlled so that the titanium content of the resultant titanated silica support is from 1 to 5% by weight, and preferably 2 to 5 wt %, based on the weight of the titanium-aluminium-silica support.

The silica support will thus have a three-layer structure.

Aluminium is responsible for generating the higher molecular weight part of the high density polyethylene (HDPE) product.

A chromium compound is then deposited on the titanated and aluminated silica support. Preferably the support is impregnated with a chromium solution, preferably, an organic chromium compound solution, such as chromium acetylacetonate, in order to form a multiple-site chromium catalyst. The resultant catalyst contains between 0.1 and 2 wt % of chromium, and preferably around 1 wt % of chromium, based on the total weight of the catalyst.

After impregnation, the catalyst is washed and dried.

The catalyst is activated and can be further fluorinated in order to increase its activity. For example, the chromium catalyst may be premixed with ammonium boron tetrafluoride ($NH_4BF_4$) in solid form. The composite catalyst is then subjected to an activation step in dry air in a fluidised bed activator, at an elevated activation temperature, for at least 6 hours. The activation temperature preferably ranges from 500 to 850° C., and is most particularly around 650° C. The fluorination treatment will act mainly on the aluminium layer and will improve the comonomer incorporation during polymerisation.

Optionally, after activation, the resultant chromium/silica-titanium-aluminium catalyst is subjected to a chemical reduction process in which at least a portion of the chromium is reduced to a low valence state. Preferably, the chromium-based catalyst is reduced in an atmosphere of dry carbon monoxide, pure or diluted in an inert gas stream, at a temperature of from 250 to 500° C., more preferably at a temperature of from 350 to 450° C., and most preferably at a temperature of around 370° C. The reduction treatment prevents the production of oxygenates that act as poison for the catalyst, and that are responsible for the production of short, highly copolymerised chains.

Polymerisation can be carried out either in the gas phase or in the liquid phase. In the preferred polymerisation process of the present invention, the polymerisation or copolymerisation process is carried out in a single reactor, in the liquid phase, the liquid comprising ethylene, and where required an alpha-olefinic comonomer comprising from 3 to 10 carbon atoms, in an inert diluent. The comonomer may be selected from 1-butene, 1-hexene, 4-methyl 1-pentene, 1-heptene, 1-octene. The inert diluent is preferably isobutane. The polymerisation process is typically carried at a temperature of from 85 to 110° C., preferably from 90 to 106° C. and at a pressure larger than 20 bars, preferably from 30 to 42 bars.

Typically, in the polymerisation process the ethylene monomer comprises from 0.5 to 10% by weight, typically around 5% by weight, of the total weight of the liquid phase. Typically, in the copolymerisation process the ethylene monomer comprises from 0.5 to 8% by weight and the comonomer from 0 to 2% by weight, each based on the total weight of the liquid phase.

The chromium/silica-titanium-aluminium catalyst is introduced into the polymerisation reactor. The ethylene monomer, and comonomer if present, are fed into the polymerisation reactor. In the preferred process of the present invention, the polymerisation or copolymerisation process is carried out in a liquid-full loop reactor. After a residence time in the reactor of 0.3 to 2 hours, and preferably of about one hour, the polyethylene is recovered. The polymerisation product of high density polyethylene is discharged from the settling legs and separated from the diluent which can then be recycled.

Scanning Electron Microscopy/Energy Dispersive X-Ray (SEM/EDX) analysis has shown the presence of an aluminium and titanium gradient across the catalyst particles. The linescans further show that aluminium and titanium are both mainly located in a thin separate external layer at the surface of the catalyst particle. It must be noted however that, when the titanium compound is deposited on the silica support before the aluminium compound, the melt index is higher, the shear response is higher and the molecular weight distribution is broader. It is therefore preferred to deposit the titanium compound on the silica support before proceeding with the deposition of the aluminium compound.

The gel permeation chromatography (GPC) analyses of the polyethylene produced with the catalyst of the present invention indicates an activity of aluminium-rich sites by the presence of a high molecular weight shoulder in the molecular weight distribution.

The catalyst of the present invention have a good activity and produce high density polyethylene having a good melt index potential, the melt index being higher when the titanium compound is deposited first on the support. In all instances, they produce polyethylene with high environmental stress crack resistance (ESCR).

The invention can best be described by the following examples.

EXAMPLE 1

A silica support was introduced in an activator vessel incorporating a fluidised bed, flushed under nitrogen and the temperature was raised from room temperature to 300° C. The dehydration step was then carried out at this elevated temperature for 2 hours. After the dehydration step, titanium tetraisopropoxide (Tyzor), stored under anhydrous nitrogen, was progressively injected in the bottom of the activator vessel incorporating the fluidised bed. The amount of titanium tetraisopropoxide injected was calculated in order to give the required titanium content in the resultant catalyst and the flow thereof was adjusted in order to continue the injection to complete the desired level of titanation in around 30 minutes. After the injection was completed, the catalyst was flushed under nitrogen and then under air for around 45 minutes. In a glove box, under nitrogen atmosphere, 40 g of the dried $SiO_2$—$TiO_2$ silica so prepared were placed in a one liter flask. 400 ml of dried toluene were then added to the silica and the mixture was thoroughly mixed with a magnetic stirrer. A cooler was connected to the flask. For the alumination step, 11.14 g of methylalumoxane (MAO) 30 wt % were added drop by drop to the $SiO_2$—$TiO_2$ silica in suspension in toluene. While the MAO was added, the solution was heated with reflux during 4 hours at a temperature of 105-110° C. The support $SiO_2$—$TiO_2$-MAO, while still under nitrogen, was filtered on a buchner with a vacuum pump and the filtrate was cleaned twice with pentane in order to remove toluene.

In a tubular oven, the dried $SiO_2$—$TiO_2$-MAO support was placed under nitrogen in a quartz activator. Under nitrogen fluidisation, the support was heated at 120° C. during one hour. The support was then oxidised in dried air, while first raising the temperature from 120° C. to 500° C. in 5 hours and then keeping it at 500° C. during 4 hours. A solution was prepared by dissolving 2.1 g of chromium acetylacetonate in 150 ml of acetone. The solution was added to the support in order to obtain a chromium content of 1 wt % of chromium, based on the weight of the catalyst.

The silica-titania-alumina/chromium catalyst was activated at a temperature of 650° C. during 6 hours in a flow of dry air.

EXAMPLE 2

In example 2, the catalyst of example 1 was fluorinated with 1.4 wt % of $NH_4BF_4$ during the activation procedure.

EXAMPLE 3

In a glove box, under nitrogen atmosphere, 39 g of dried silica were placed in a one litre flask. 400 ml of dried toluene were then added to the silica and the mixture was thoroughly mixed with a magnetic stirrer. A cooler was connected to the flask. For the alumination step, 11.14 g of methylalumoxane (MAO) 30 wt % were added drop by drop to the silica in suspension in toluene. While the MAO was added, the solution was heated with reflux during 4 hours at a temperature of 105-110° C. The support $SiO_2$-MAO, while still under nitrogen, was filtered on a buchner with a vacuum pump and the filtrate was cleaned twice with pentane in order to remove toluene.

In a tubular oven, the dried $SiO_2$-MAO support was placed under nitrogen in a quartz activator. Under nitrogen fluidisation, the support was heated at 120° C. during one hour. The support was then oxidised in dried air, while first raising the temperature from 120° C. to 500° C. in 5 hours and then keeping it at 500° C. during 4 hours. The $SiO_2$—$Al_2O_3$ support was then treated with titanium tetraisopropoxide (Tyzor) at 300° C. using the titanation procedure described in Example 1. The $SiO_2$—$Al_2O_3$-Tyzor support was oxidised under air at 300° C. during 2 hours.

A solution was prepared by dissolving 2.1 g of chromium acetylacetonate in 150 ml of acetone. The solution was added to the support in order to obtain a chromium content of 1 wt % of chromium, based on the weight of the catalyst.

The silica-alumina-titania/chromium catalyst was fluorinated with 1.4 wt % of $NH_4BF_4$ and activated at a temperature of 650° C. during 6 hours.

The amounts of chromium, aluminium titanium and silicium have been determined by X-Ray fluorescence (XRF). The samples to be studied by XRF were prepared by crushing together 0.5 g of catalyst and 6 g of Borax in order to obtain a homogeneous powder. They were then heated to an elevated temperature of from 1300 to 1400° C. and shaped into a pearl to be analysed. The fluorine amount has been determined by elementary analyses. The surface areas and the pore volumes have been calculated from N2 adsorption/desorption using the BET/BJH method.

These data are summarised in FIGS. 1 and 2 and in Table I.

TABLE I

| Example | Surface area ($m^2/g$) | Pore volume (ml/g) | Wt % Cr | Wt % Al | Wt % Ti | Wt % F |
|---|---|---|---|---|---|---|
| 1 | 583 | 2.5 | 1.04 | 3 | 4 | — |
| 2 | 549 | 2.4 | 1.05 | 3.14 | 4.02 | 0.9 |
| 3 | 457 | 2.2 | 1.04 | 2.8 | 4.6 | 1.3 |

These catalysts have been used to produce ethylene copolymer.

Polymerisation was performed in a 4 liter autoclave reactor. Ethylene was copolymerised with hexene and two batches were prepared: one contained 6 wt % of ethylene and 0.14 wt % of hexene added in one shot, the other contained 6 wt % of ethylene and 0.5 wt % of hexene added in one shot. Two liters of isobutane were added as diluent. The polymerisation temperature was between 92 and 104° C. The results are summarised in FIGS. 3 to 8 and in Table II.

Figure 1:
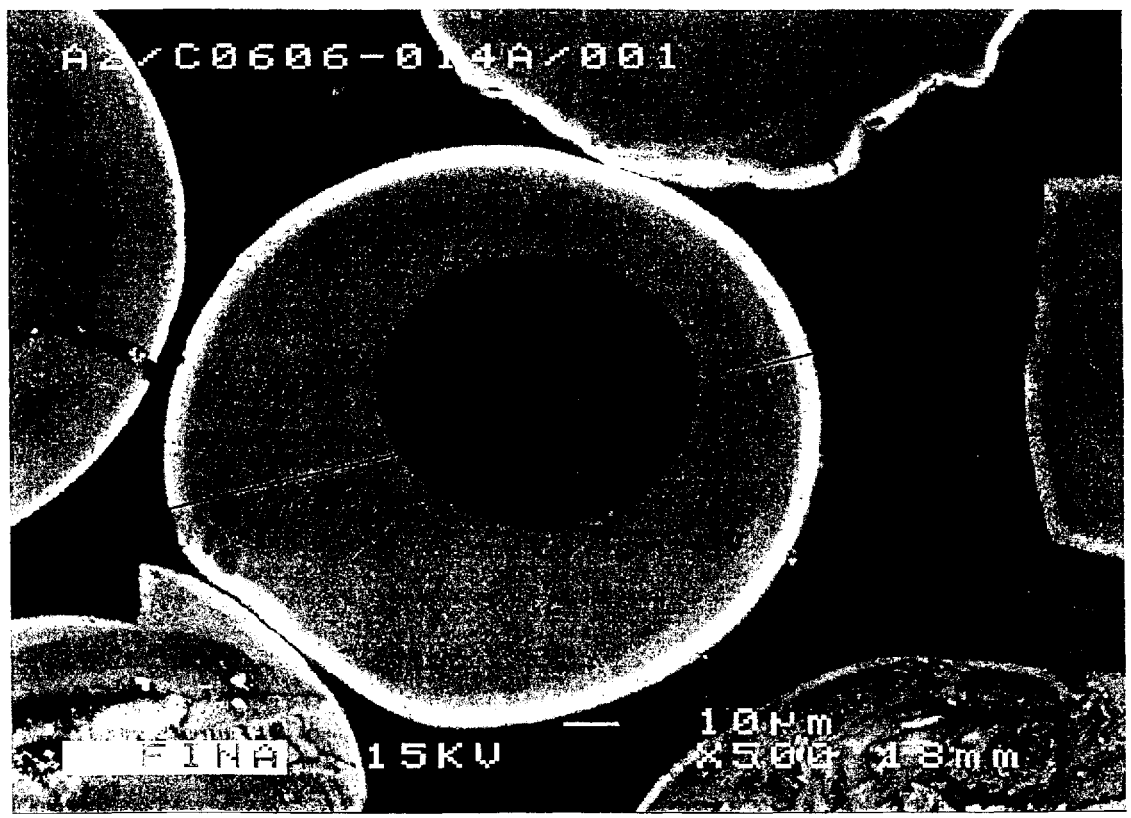
FIG. 1 represents a multilayer catalyst grain.
Figure 2:
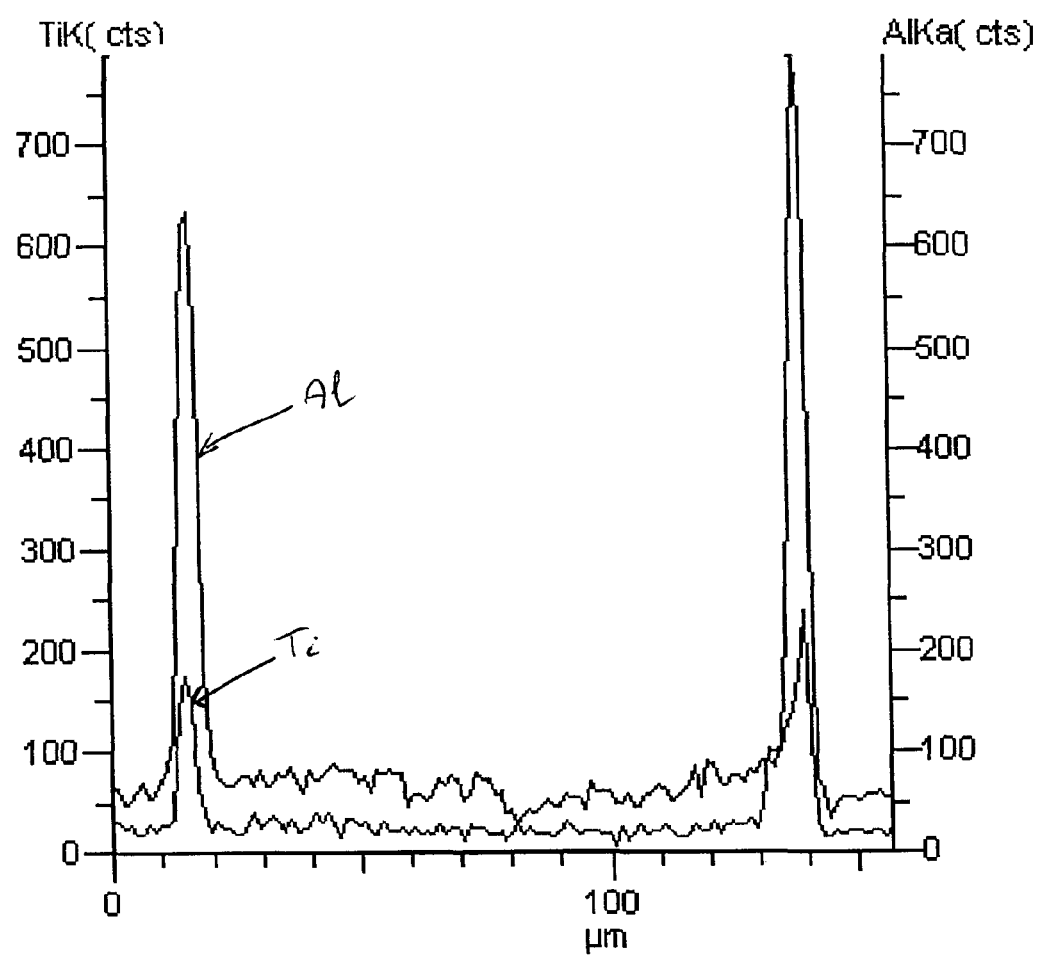
FIG. 2 represents a Scanning Electron Microscopy/Energy Dispersive X-Ray (SEM/EDX) linescan showing the Kα line of aluminium and the K line of titanium, both located in a thin external layer of the catalyst grain.
Figure 3:
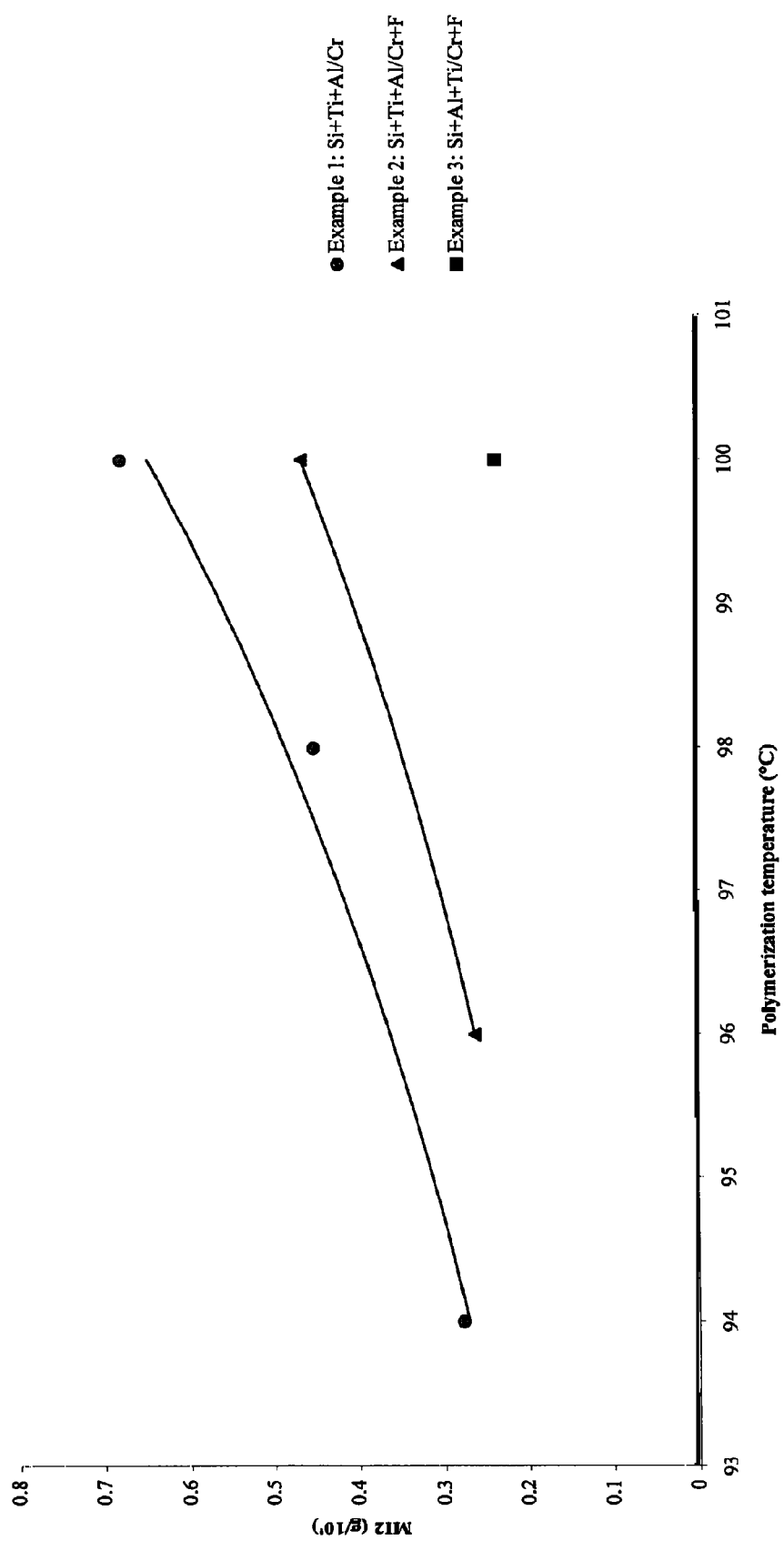

FIG. 3 represents the melt index MI2 as a function of polymerisation temperature for a copolymer prepared with 6 wt % of ethylene and 0.14 wt % of hexene and using respectively the catalysts of examples 1 to 3. The melt index MI2 is measured by the method ASTM D-1238, under a load of 2.16 kg and at a temperature of 190° C.

Figure 4:
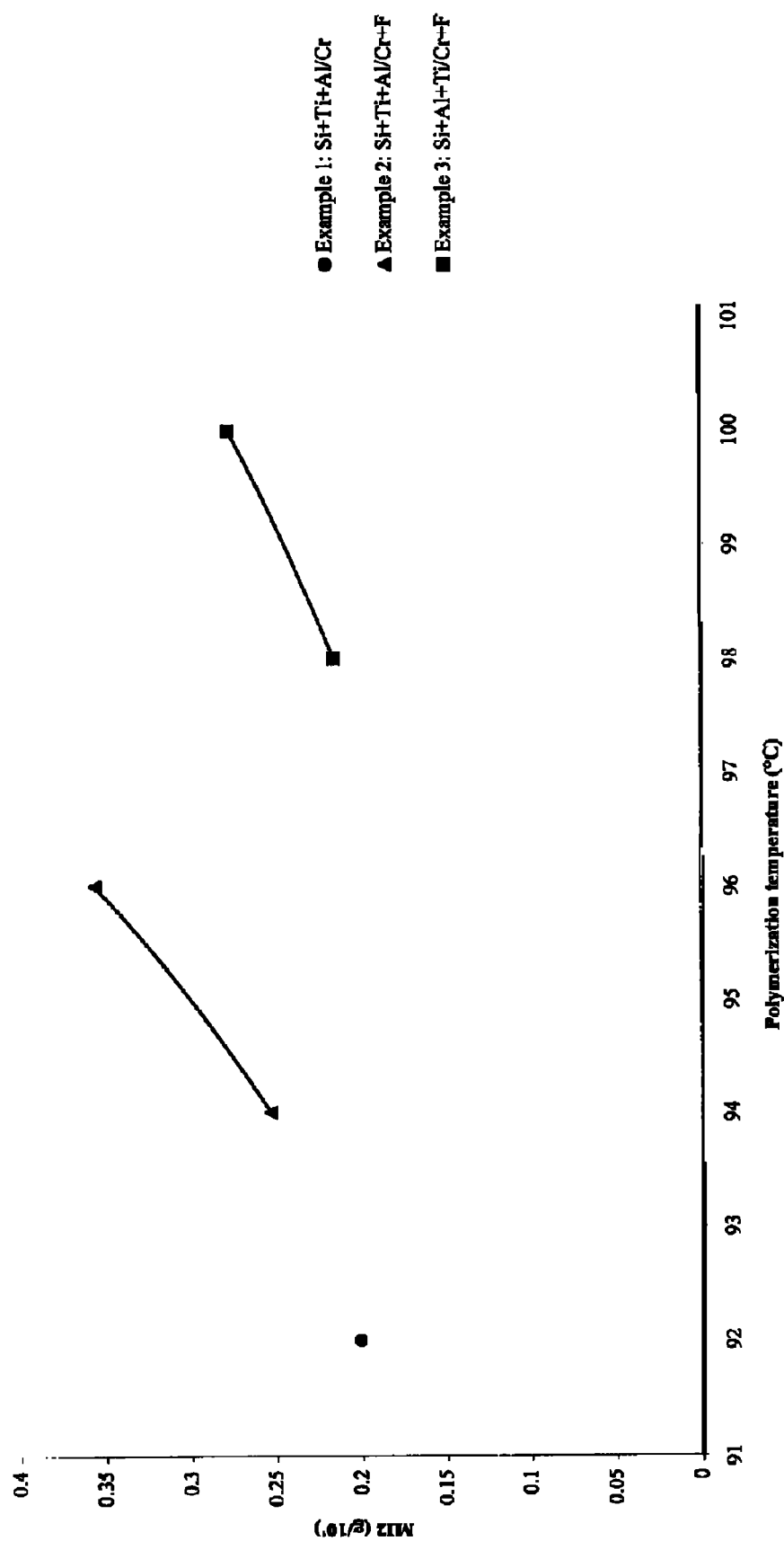

FIG. 4 represents the melt index MI2 as a function of polymerisation temperature for a copolymer prepared with 6 wt % of ethylene and 0.5 wt % of hexene and using respectively the catalysts of examples 1 to 3.

Figure 5:
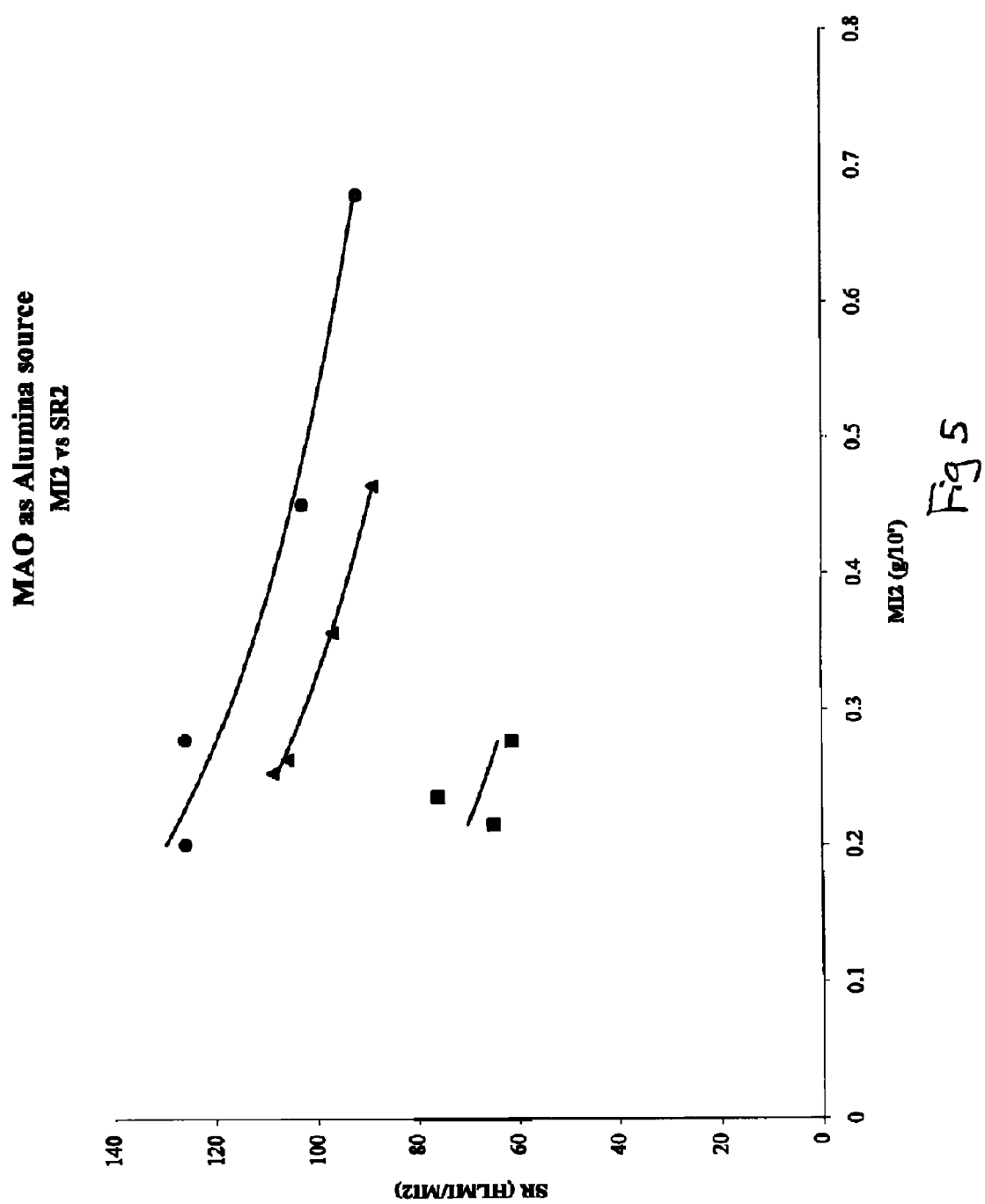

FIG. 5 represents the shear response (SR) as a function of melt index MI2, for copolymers obtained respectively with the catalysts of examples 1 to 3. SR is defined as the ratio HLMI/MI2 where HLMI is the high load melt index measured by the method ASTM D-1238, under a load of 21.6 kg and at a temperature of 190° C.

Figure 6:
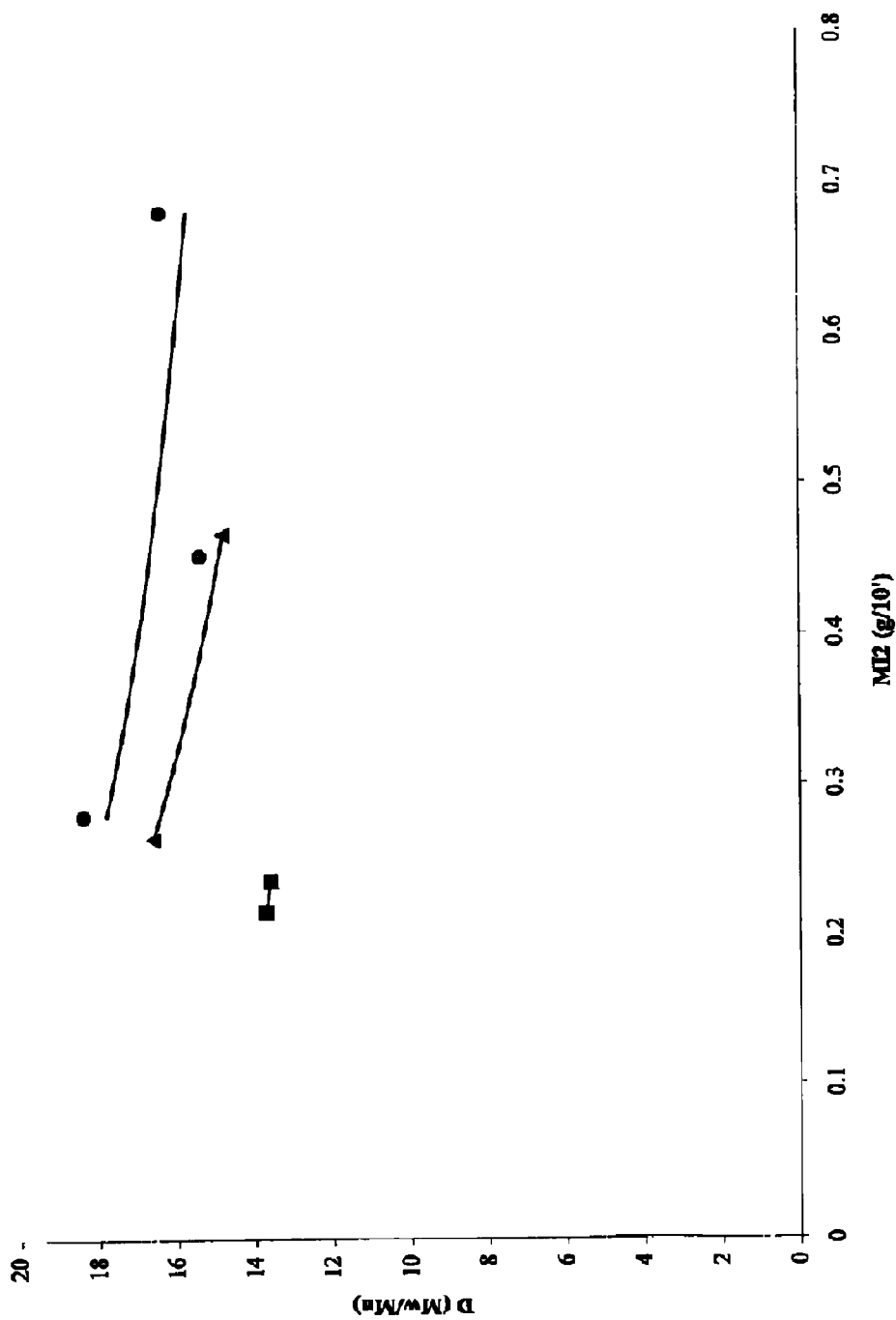

FIG. 6 represents the molecular weight distribution (MWD) determined by GPC as a function of the melt index MI2, for copolymers of ethylene obtained respectively with the catalysts of examples 1 to 3.

Figure 7:
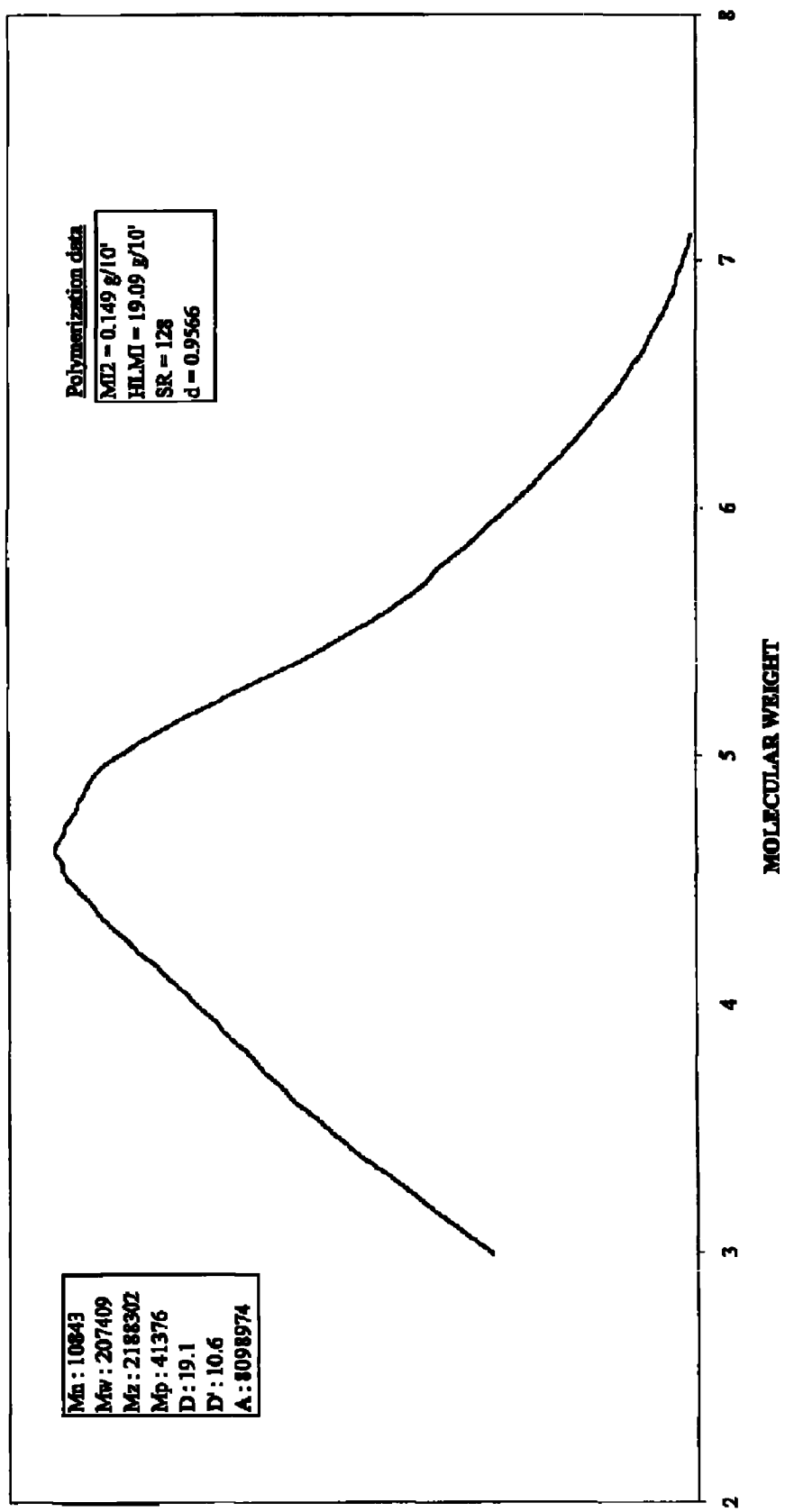

FIG. 7 represents the molecular weight distribution, obtained by gel permeation chromatography, for the copolymer of ethylene prepared with the catalyst of example 1.

Figure 8:
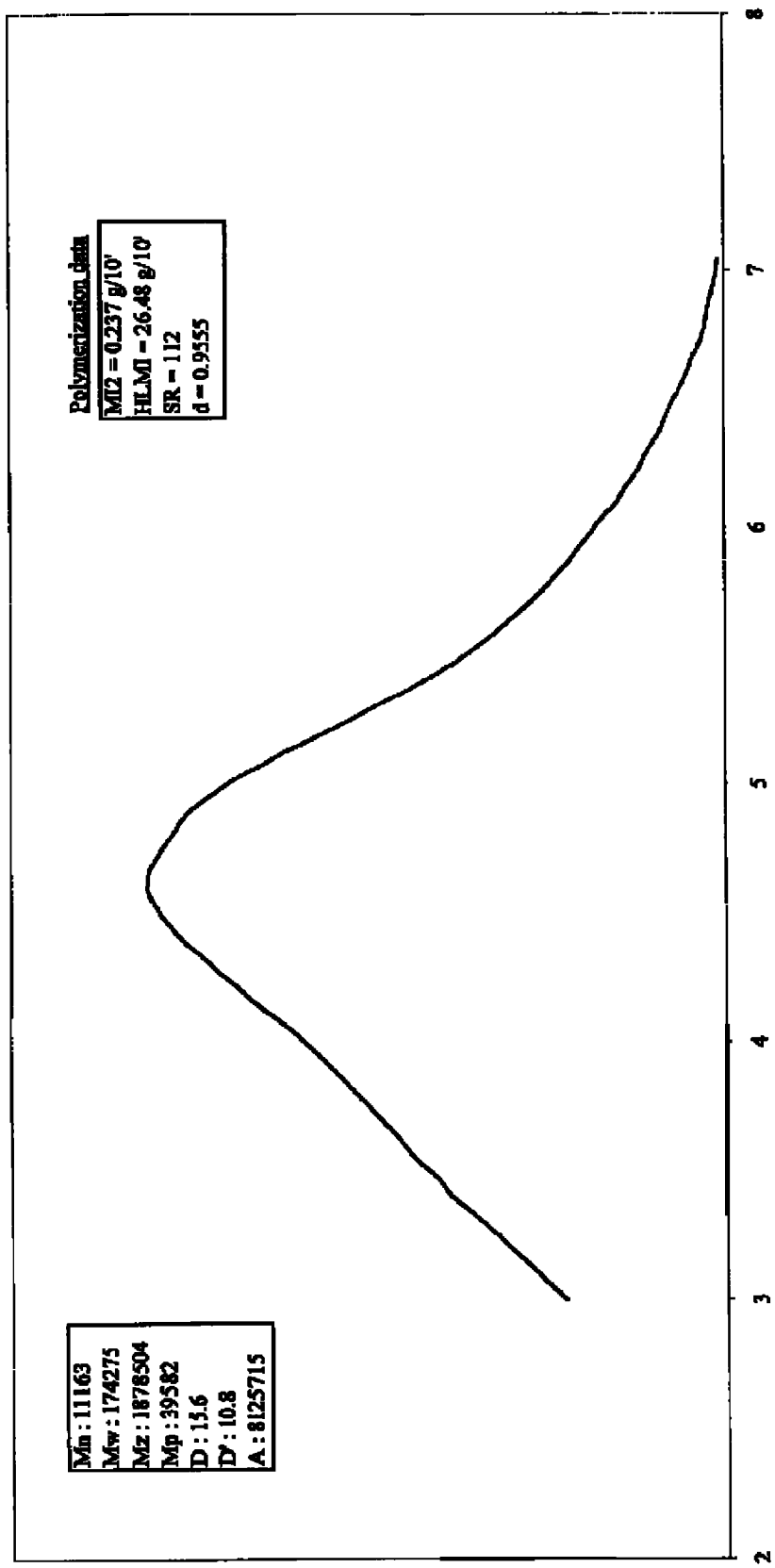

FIG. 8 represents the molecular weight distribution obtained by gel permeation chromatography, for the copolymer of ethylene prepared with the catalyst of example 2.

Figure 9:
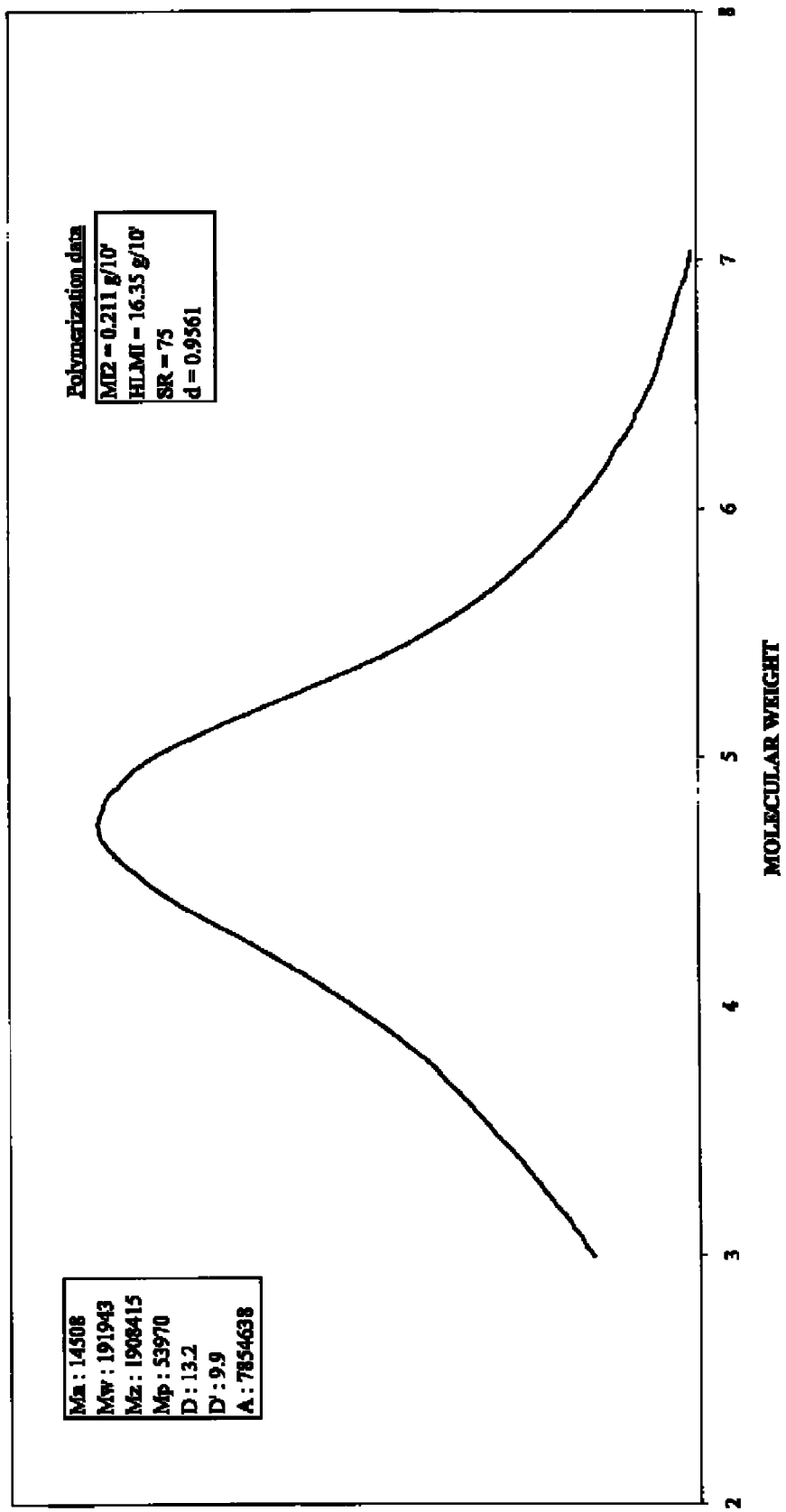

FIG. 9 represents the molecular weight distribution obtained by gel permeation chromatography, for a copolymer of ethylene prepared with the catalyst of example 3.

It can be seen from FIGS. 3 and 4 that the copolymers of ethylene obtained with the catalyst of example 1, i.e. the catalyst prepared by first titanating the silica support and then aluminating the titanated silica support, has a higher melt index MI2 at equivalent polymerisation temperature.

FIG. 5 and FIG. 6 similarly show respectively that higher shear response and broader molecular weight distribution are obtained for the copolymers prepared with the catalyst of example 1.

These results are summarised in Table II.

TABLE II[a]

| Catalyst | MI2 g/10' | HLMI g/10' | Density $g/cm^3$ | SR | MWD | ESCR Hr |
|---|---|---|---|---|---|---|
| Example 1 | 0.149 | 19.09 | 0.9566 | 128 | 19.1 | 98 |
| Example 2 | 0.237 | 26.48 | 0.9555 | 112 | 15.6 | 105 |
| Example 3 | 0.211 | 16.35 | 0.9561 | 75 | 13.2 | 78 |

[a]The polymerisation temperature and amount of comonomer have been adjusted in order to obtain the same density for the three polyethylenes presented in this table.

The environmental stress crack resistance ESCR to herein is the Bell ESCR F50 determined in accordance with ASTM D-1693-70, Procedure B. 100% at 50° C.

The invention claimed is:

1. A catalyst suitable for the production of high density polyethylene comprising the product of combining:
   silica support comprising grains having a specific surface area larger than 450 $m^2/g$;
   a titanium compound; and then
   a polymeric aluminum oxyalkyl; and then
   a chromium compound; said catalyst having an external shell consisting essentially of chromium.

2. The catalyst of claim 1 wherein said catalyst is activated using heat in the range of from 600° C.-800° C.

3. The catalyst of claim 1 wherein the support is oxidized prior to combination with the chromium compound.

4. The catalyst of claim 1 wherein the catalyst has been fluorinated.

5. The catalyst of claim 1 wherein said titanium compound is characterized by the formula $R_nTi(OR')_m$ or $(RO)_nTi(OR')_m$ wherein R and R' are the same or different and comprise a hydrocarbyl group containing from 1 to 12 carbon atoms, n is within the range of 0-3, m is within the range of 1-4, and the sum of m+n equals 4.

6. The catalyst of claim 1 wherein said titanium compound is characterized by the formula $Ti(OR')_4$ wherein R' is an alkyl or a cycloalkyl group having from 3 to 5 carbon atoms.

7. The catalyst of claim 1 wherein said titanium compound is titanium isopropoxide.

8. The catalyst of claim 1 wherein said polymeric aluminum oxyalkyl is methyl alumoxane.

9. The catalyst of claim 1 wherein said silica support comprises silica grains having a pore volume greater than 1.5 ml/g.

10. The catalyst of claim 1 wherein said silica support comprises silica grains having a surface a pore volume greater than 2 ml/g.

11. The catalyst of claim 1 having a titanium content within the range of 1-5 wt. %.

12. The catalyst of claim 1 having a chromium content of within the range of 0.1-2 wt. %.

* * * * *